US007620541B2

(12) United States Patent
Kharrat

(10) Patent No.: US 7,620,541 B2
(45) Date of Patent: Nov. 17, 2009

(54) CRITIQUING CLITIC PRONOUN ORDERING IN FRENCH

(75) Inventor: Alma Kharrat, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 863 days.

(21) Appl. No.: 10/857,206

(22) Filed: May 28, 2004

(65) Prior Publication Data

US 2005/0267735 A1 Dec. 1, 2005

(51) Int. Cl.
*G06F 17/27* (2006.01)
*G06F 17/20* (2006.01)

(52) U.S. Cl. .................. 704/9; 704/8; 715/232

(58) Field of Classification Search ............. 704/8, 704/9, 10; 715/532, 533
See application file for complete search history.

(56) References Cited

U.S. PATENT DOCUMENTS

| | | | | |
|---|---|---|---|---|
| 5,521,816 A | * | 5/1996 | Roche et al. ............... | 704/9 |
| 5,799,269 A | * | 8/1998 | Schabes et al. ............ | 704/9 |
| 6,442,524 B1 | * | 8/2002 | Ecker et al. ............. | 704/277 |
| 6,658,377 B1 | * | 12/2003 | Anward et al. ............. | 704/9 |
| 7,003,444 B2 | * | 2/2006 | Weise ..................... | 704/9 |
| 7,010,479 B2 | * | 3/2006 | Murata et al. ............ | 704/9 |
| 7,013,262 B2 | * | 3/2006 | Tokuda et al. ........... | 704/9 |
| 7,043,420 B2 | * | 5/2006 | Ratnaparkhi ............. | 704/9 |
| 7,058,567 B2 | * | 6/2006 | Ait-Mokhtar et al. ........ | 704/9 |
| 7,143,350 B2 | * | 11/2006 | Jurion et al. ............ | 715/536 |
| 7,184,950 B2 | * | 2/2007 | Weise ..................... | 704/9 |
| 2002/0133331 A1 | * | 9/2002 | Kharrat .................. | 704/9 |
| 2003/0130837 A1 | * | 7/2003 | Batchilo et al. ......... | 704/9 |
| 2004/0193401 A1 | * | 9/2004 | Ringger et al. .......... | 704/9 |

OTHER PUBLICATIONS

Emirkanian, I. et al., "Knowledge Integration on a Robust and Efficient Morpho-Syntactic Analyzer for French," 1988, Proc of the 12th conference of Computational Lingusitics -vol. 1. pp. 166-171.*
J. Barchan et al., "A prolog-based tool for French grammar analysis," Jan. 1986, Instructional Science, vol. 15 No. 1, pp. 21-48.*
"Pronouns Order," http://www.orbilat.com/Languages/French/Grammar/Syntax/Pronouns/French-Syntax-Pronouns_Order.html web archive from May 12, 2004.*

(Continued)

*Primary Examiner*—Michael N Opsasnick
*Assistant Examiner*—Douglas C Godbold
(74) *Attorney, Agent, or Firm*—Westman, Champlin & Kelly, P.A.

(57) ABSTRACT

A grammar checker configured to correctly order pronouns. By analyzing the inflection of marker words in a textual input, the grammar checker is able to identify errors of pronoun ordering in the textual input. The grammar checker parses the textual input to identify the case of each of the pronouns in the textual input. A list of ordering rules is provided to the grammar checker based on the inflected marker word, and used to generate suggested corrections to the user. A French grammar checker corrects these errors based on whether the marker word is an imperative verb or a non-imperative verb.

20 Claims, 7 Drawing Sheets

OTHER PUBLICATIONS

Helfrich et al., A., "Design and evaluation of grammar checkers in multiple languages", Coling 2000, pp. 1036-1040.

Carlberger et al., 1., "A Swedish Grammar Checker", Association for Computational Linguistics, 2000.

Murphy-Judy et al., K., "Calico Software Review", Sans-Faute Writing Environment, Apr. 2002.

http://www.druide.com/antidote.html, As of Jul. 11, 2005.

http://www.synapse-fr.com/sub_produits.htm, As of Jul. 11, 2005.

* cited by examiner

FIG. 6

| Input | Donne | moi | le | |
|---|---|---|---|---|
| Identified cases | Imperative | Dative | Accusative | |
| | | | | |
| Ordering Rule | Imperative | Accusative | Dative | Locative |
| Suggestion | Donne | le | moi | |

FIG. 8

| Input | Il | en | le | ramen |
|---|---|---|---|---|
| Identified Cases | noun | locative | accusative | non-imperative |
| | | | | |
| Ordering Rule | Pre-Dative | Accusative | Post-Dative | Locative | Non-Imperative |
| Suggestion | | le | | en | ramen |

CRITIQUING CLITIC PRONOUN ORDERING IN FRENCH

BACKGROUND OF THE INVENTION

The present invention relates to natural language processing. In particular, the present invention relates to grammar checker processing of natural language text.

A computer program that checks a user's grammar for correctness is called a grammar checker. Upon finding a mistake, a grammar checker usually flags the error to the user and suggests a correction. Users find grammar checkers to be very helpful. However the usefulness is dependent on the quality of the corrections the grammar checker suggests. The higher the accuracy, the happier the user.

Grammar checkers are often evaluated by independent sources who look at the effectiveness of the grammar checker. During the evaluations the testers or press reviewers often introduce unnatural errors into a textual input (in addition to natural ones), to see whether the grammar checker is able to identify and provide a correction to these unnatural errors. For example, in French, pronoun word order is extremely important, and is dependent upon the specific inflection of the verb in the sentence. Often in a test text the tester will provide a textual input such as "Il en leur parle." (He talks to them about it.) to test the effectiveness of the grammar checker. This input has a pronoun word ordering error. The grammatically correct version of this phrase is "Il leur en parle." The tester is looking for the grammar checker to identify the ordering error, and to provide a correct suggested correction to the user.

However, traditional French grammar checkers have ignored this type of error, because it is assumed that a native speaker would not make this ordering error. Thus, this error is referred to as an unnatural error. As current generation grammar checkers are not programmed to recognize this error, no indication is made to the user. If an indication is made to the user, there is no viable correction provided. This results in a lower rating by the tester of the grammar checker.

Further, with the advent and increased use of machine translators, these types of ordering errors are becoming more frequent in translated texts, because the machine translator by design does not understand all of the grammar rules for the specific language that a text is being translated into. Machine translators often return results that include word ordering errors, caused by different sentence structures of the two languages, ignored or omitted elision (contraction) (e.g. le en in French should be l'en), and ignored or omitted compounding (e.g. in Hebrew and Arabic prepositions followed by pronouns are compounded, for instance, אתה + ל (to you) should be לך in Hebrew and هو + ل (for him) should be لـه in Arabic). Often times these errors are missed by a reader when reviewing the translated documents because the reader makes the correction of the errors mentally without realizing it. Therefore it is desirable to have a grammar checker that is able to identify these errors and provide corrections to enhance the finished machine translation documents.

SUMMARY OF THE INVENTION

The present invention addresses the needs of users of grammar checkers. Unlike prior grammar checkers, the grammar checker of the present invention checks for and corrects grammatical errors such as incorrect pronoun word ordering with a degree of reliability suitable for use with text processing computer programs. Further, the grammar checker includes the capability to correct errors of compounding and contraction caused by machine translators. The grammar checker provides a reasonably limited number of proposed corrections to the user when an ordering error or compounding error is detected.

In one embodiment of the present invention the grammar checker is configured to identify and correct pronoun ordering errors in French. First the grammar checker determines if there are at least two pronouns in the textual input. If there are two pronouns in the textual input, the grammar checker determines the inflection of the verb for the sentence. Based on the inflection of the verb, the grammar checker obtains a pronoun ordering rule from a list of ordering rules stored in an ordering rule component. The ordering rule component contains ordering rules for verbs having the imperative inflection and verbs having a non-imperative inflection. Further, the ordering rule for non-imperative verbs includes information related to the dative pronouns for example by identifying certain dative pronouns as pre-dative pronouns and others as post-dative pronouns. Next the grammar checker checks the order of the pronouns versus the obtained ordering rule. If the pronouns are out of order, the grammar checker indicates the ordering error to the user, and provides the user with a suggested correction to the ordering error. This correction can include any elision that is required, and a possible non-ordering error correction.

BRIEF DESCRIPTION OF THE DRAWINGS

FIG. 6 is a diagram illustrating the listing of the inflection and cases of the words in a textual input.

FIG. 8 is a diagram illustrating the listing of the inflection and cases of the words in a textual input.

DETAILED DESCRIPTION OF ILLUSTRATIVE EMBODIMENTS

Figure 1:
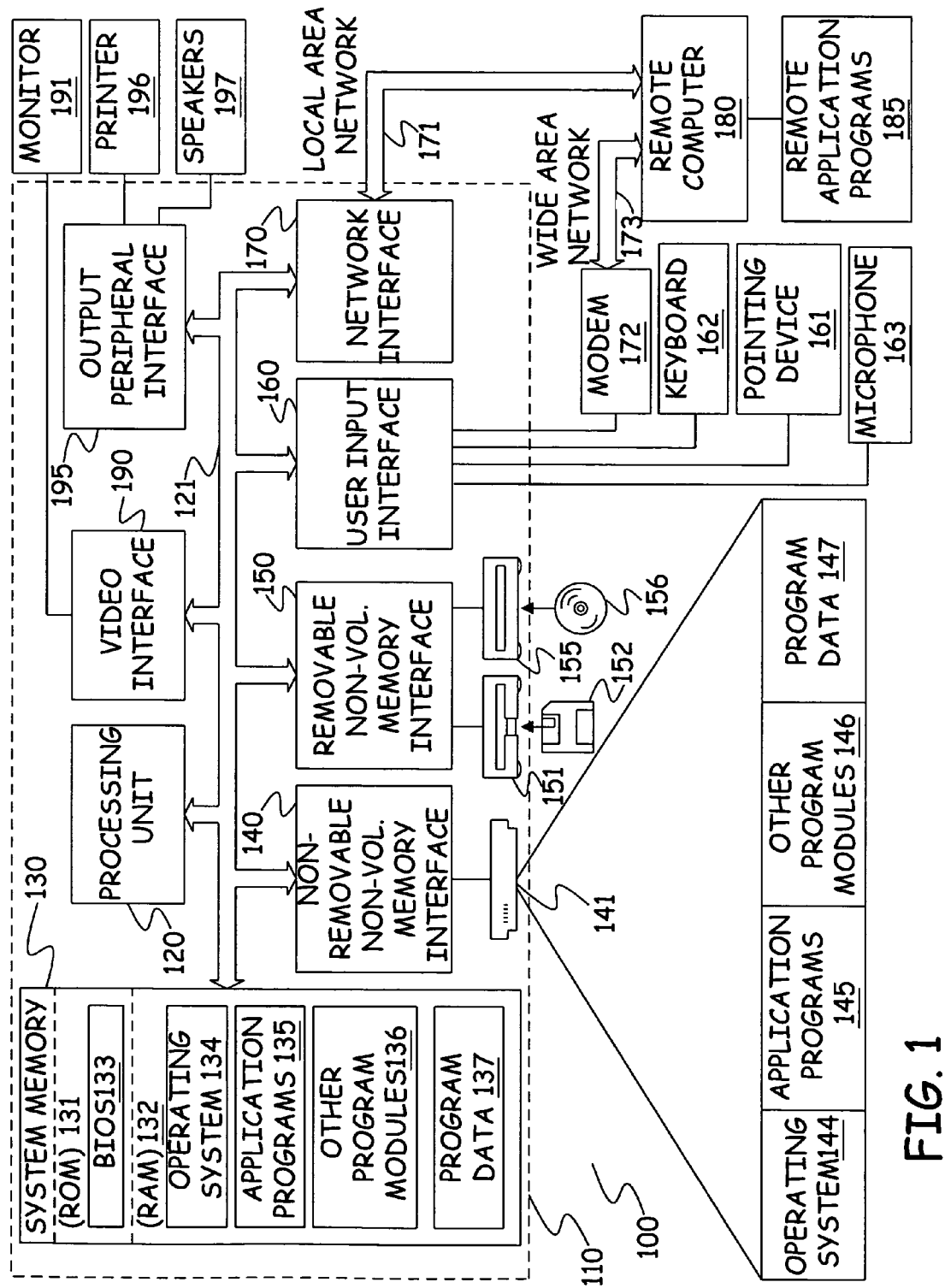
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The present invention is directed to a grammar checker on a computer system that is capable of identifying incorrectly ordered words in a textual input. The core of a grammar checker or natural language processing (NLP) system is its parser. Generally, a parser breaks an utterance (such as a phrase or sentence) down into its component parts with an explanation of the form, function, and syntactical relationship of each part. The parser takes a phrase and builds for the computer a representation of the syntax of the phrase that the computer can understand. A parser may produce multiple different representations for a given phrase. The representation makes explicit the role each word plays and the relationships between the words. As used herein, an utterance is equivalent to a phrase. A phase is a sequence of words intended to have meaning. In addition, a sentence is understood to be one or more phrases. In addition, references herein to a human speaker include a writer and speech includes writing.

Figure 2:
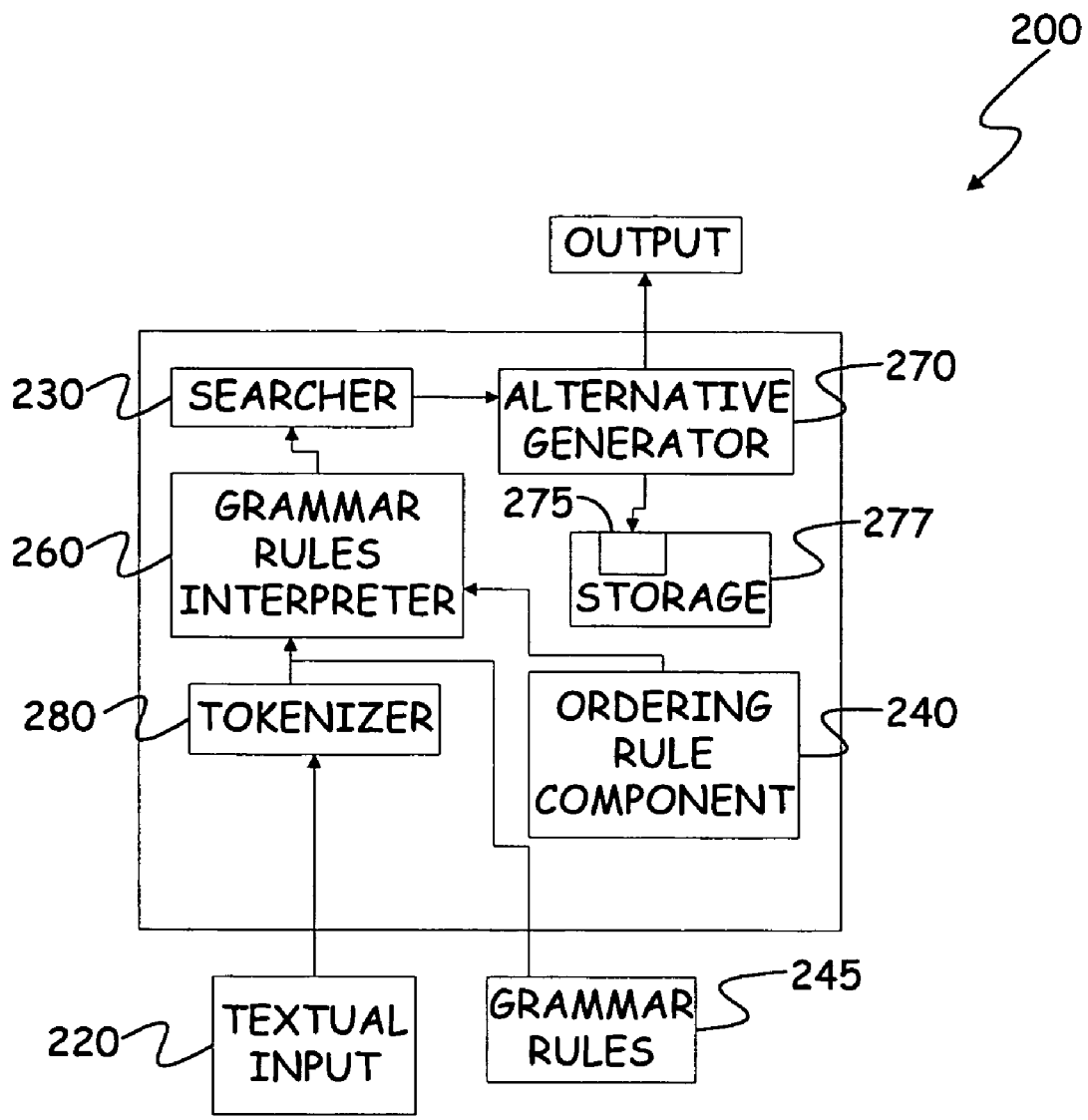
FIG. 2 illustrates the components of a grammar checking system according to one embodiment of the present invention.

FIG. 2 illustrates a parser 200 of a typical grammar checking system according to one embodiment of the present invention. The parser 200 has four components: tokenizer 280; grammar rules interpreter 260; searcher 230; and ordering rule component 240. The parser 200 receives a textual string 220. Typically, this is a sentence or a phrase. The parser also receives grammar rules 245. These rules attempt to codify and interpret the actual grammar rules of a particular natural language, such as French. The ordering rule component 240 provides the grammar rule interpreter information related to the ordering of words in a sentence. In one embodiment the ordering rule component includes ordering rules related to pronoun ordering of pronouns in verb phrases. However, other ordering rules can be stored and provided by ordering component 240. Alternatively, these rules may be stored in memory within the parser.

In one embodiment, the grammar rules interpreter 260 interprets the codified grammar rules and the ordering rules. The tokenizer 280 identifies the words in the textual string 220, looks them up in a database (such as a dictionary), makes records for the parts of speech (POS) of a word, and passes these to the searcher. The searcher 230 in cooperation with the grammar rules interpreter and the ordering rule component 240 generates a grammatically correct parse of the textual string.

Linguists group words of a language into classes, which show similar syntactic behavior, and often a typical semantic type. These word classes are otherwise called "syntactic" or "grammatical categories", but are more commonly referred to by the traditional names "part of speech" (POS). For example, common POS categories for French include noun, verb, adjective, preposition, pronoun and adverb.

Generally, words are organized into phrases, which are groupings of words that are grouped as a unit. Syntax is the study of the regularities and constraints of word order and phrase structure. Among the major phrase types are noun phrases, verb phrases, prepositional phrases, and adjective phrases, by way of example.

The headword is the key word in a phrase. This is because it determines the syntactic character of a phrase. In a noun phrase, the headword is the noun. In a verb phrase, it is the main verb. For example, in the noun phrase "livre rouge" (red book), the headword is "livre" (book). Similarly, for the verb phrase "va au grand magasin" (go to the big store), the headword is "va" (go). A modifying headword is the headword of a sub-phrase within a phrase where the sub-phrase modifies the main headword of the main phrase. Assume a phrase (P) has a headword (hwP) and a modifying sub-phrase (M) within P that modifies hwP. The modifying headword (hwM) is the headword of this modifying phrase (M).

Syntactic features are distinctive properties of a word relating to how the word is used syntactically. For example, the syntactic features of a noun or pronoun include whether it is singular (e.g. chat (cat) or le (him/it)) or plural (e.g. chats (cats) leur (them)) and whether it is countable (e.g. cinq fourchettes (five forks)) or uncountable (e.g. l'air (the air)). The syntactic feature of a verb includes whether or not it takes a direct object or indirect object or if the verb is inflected in the imperative or non-imperative, for example.

In computational linguistics, which are generally used by grammar checkers and NLP, the regularities of a natural language's word order and grammar are often captured by a set of rules called "transitions" or "rewrite rules." The rewrite rules are a computer representation of rules of grammar. These transitions are used to parse a phrase. A rewrite rule has the notation form: "symbolA→symbolB symbolC . . . ". This indicates that symbol (symbolA) on the left side of the rule may be rewritten as one or more symbols (symbolB, symbolC, etc.) on the right side of the rule.

For example, symbolA may be "s" to indicate the "start" of the sentence analysis. SymbolB may be "np" for noun phrase and symbolC may be "vp" for verb phrase. The "np" and "vp" symbols may be further broken down until the actual words in the sentence are represented by symbolB, symbolC, etc. For convenience, transitions can be named so that the entire rule need not be recited each time a particular transition is referenced.

The nature of the rewrite rules is that a certain syntactic category (e.g, noun, np, vp, pp) can be rewritten as one or more other syntactic categories or words. The possibilities for rewriting depend solely on the category, and not on any surrounding context, so such phrase structure grammars are commonly referred to as context-free grammars (CFG).

Also in the grammar checker 200 is an alternative generator 270 that receives the original input string and uses a set of grammar rules to look for what might be grammatical mistakes in the original input string. If alternative generator 270 finds any potential mistakes, (including pronoun ordering) it generates one or more alternative versions 275 for the string and passes these alternative string versions, corresponding to possible grammatical corrections of the original string, to memory or storage 277. It also passes on the original string 220. The suggested correction alternatives 275, along with the original string, are collectively referred to herein as "Alternatives" 275. Storage 277, which can correspond to designated memory within a computer, is used to keep track of Alternatives 275 (including any corrected versions, and the original text string).

Figure 3:
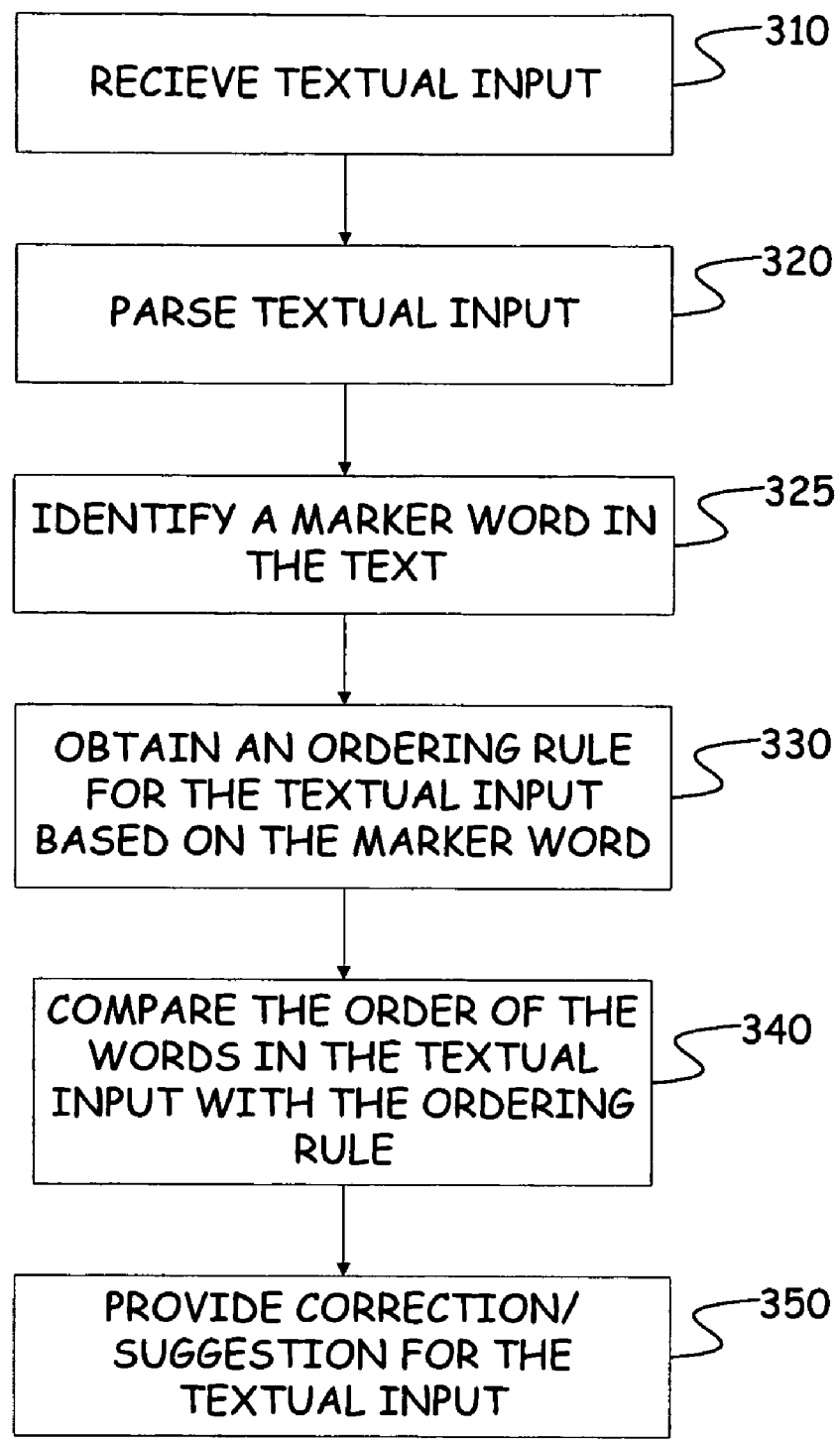
FIG. 3 is a flow diagram illustrating the steps executed by the grammar checker according to one embodiment of the present invention.

FIG. 3 is a high level flow diagram illustrating the steps executed by the grammar checker 200 according to one embodiment of the present invention. First the grammar checker 200 receives a textual input from either a user or an electronic source. This is shown at step 310. However, the textual input can be received from other sources as well. Next the grammar checker 200 parses the textual input to obtain information related to each word in the textual input, and determines the type of phrases that are present in the textual input. This is illustrated at step 320. Once the parse has been completed the grammar rule interpreter 260 identifies a marker word in the textual input at step 325. Based on this marker word the grammar rule interpreter 260 obtains an ordering rule specific to the type of textual input identified during the parse. This is illustrated at step 330. Based on the ordering rule, the grammar rule interpreter 260 checks, at step 340, if the words in the textual input are in the correct grammatical order. If the words are in the incorrect grammatical order the grammar checker 200 provides a suggestion or correction for the textual input. This is illustrated at step 350.

Figure 4:
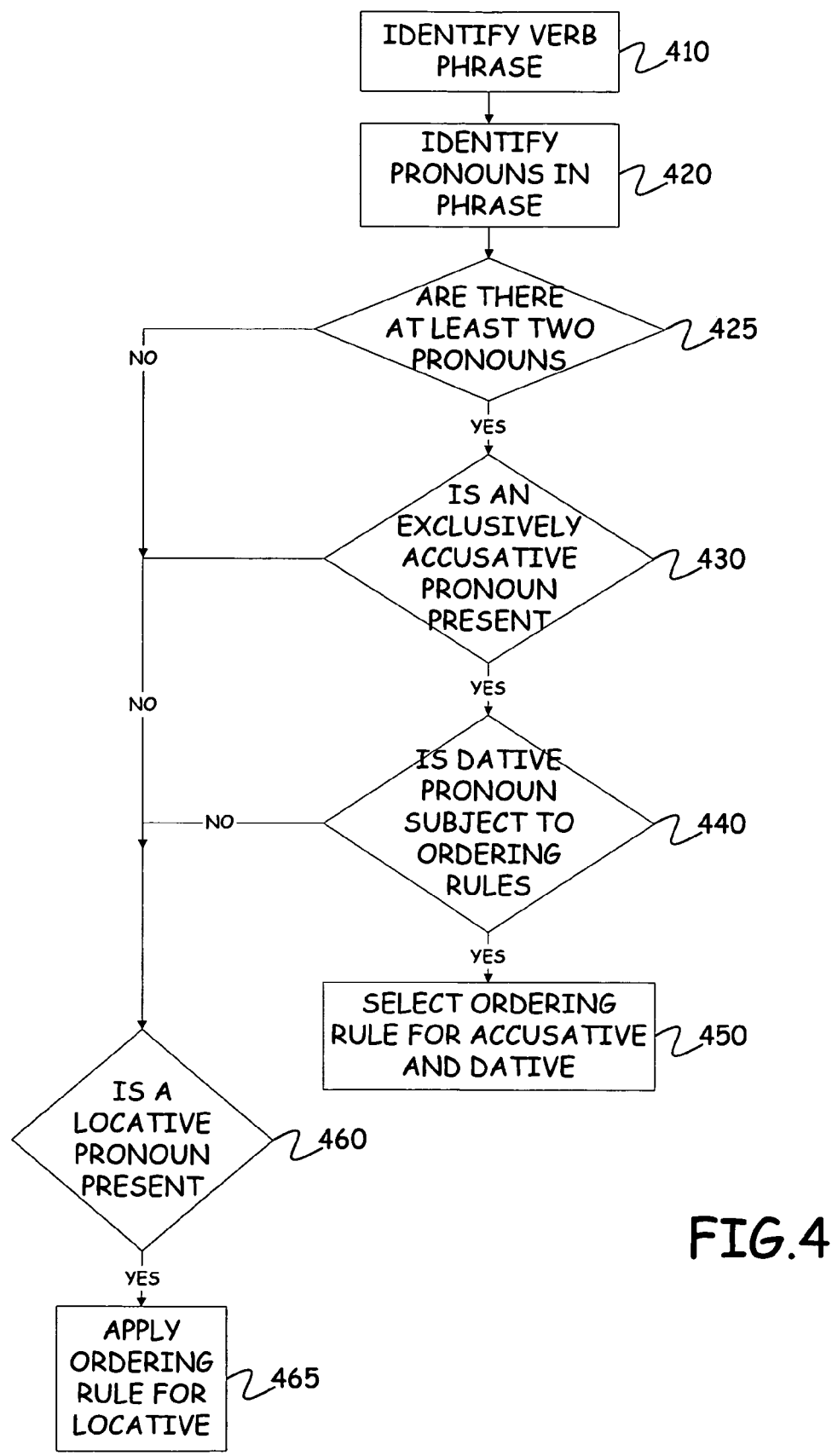
FIG. 4 is a flow diagram illustrating the steps executed in determining whether the user should be alerted to a word ordering error in the sentence.

FIG. 4 illustrates the steps that are performed, according to one embodiment of the present invention, in determining if the user should be alerted to a word ordering error in the sentence. The word ordering system of the present invention attempts to identify an ordering error in the sentence if one of two conditions is met. In this illustrative embodiment the process will be described assuming that the textual input is written in French and is directed to pronoun ordering in a verb phrase. However, other languages and phrase types can be used.

First the system identifies a verb phrase in the sentence. This is illustrated at step 410. Based on previously obtained parsed information of the sentence and the words in the sentence the system determines whether the verb phrase has both an object and an indirect object, and if both of these are pronouns. This is illustrated at step 420. If the object and indirect object are not both pronouns the system exits this check and proceeds to check if a second condition or criteria is met. (This is discussed in greater detail below.) This is illustrated at block 425.

If the first set of conditions is true the system checks to see whether the object is an exclusively accusative pronoun. This is illustrated at step 430. In French the exclusively accusative pronouns are le, la, and les (him (it, masculine), her (it, feminine), them) . If there is an exclusive accusative pronoun present the system then checks to see whether the indirect object is one of the dative pronouns that is subject to an ordering rule. This is illustrated at step 440. In French these dative pronouns are lui, leur, me, te, se, nous, or vous (him her it, them, me, you (sing.) (familiar), himself, herself, us, you (pl)(formal, singular), themselves). If both of these conditions are true the system proceeds to check whether they occur in an incorrect order. If they do, the system proceeds to apply the appropriate ordering rule for the pronouns to the sentence. This is illustrated at step 450. It should be noted that the inflection of the verb generally affects the ordering rule that is selected.

If any of the conditions above are not met the system then checks to see if there is a locative pronoun present in the verb phrase. This is illustrated at step 460. In French the locative pronouns subject to an ordering rule are "y" or "en" (these words have a meaning that indicates direction; "en" may also mean "of it/them") . If one of these locative pronouns is present in the verb phrase as well as another pronoun (accusative or dative) in an incorrect order, the system applies an ordering rule for locative pronouns. This is illustrated at step 465.

Figure 5:
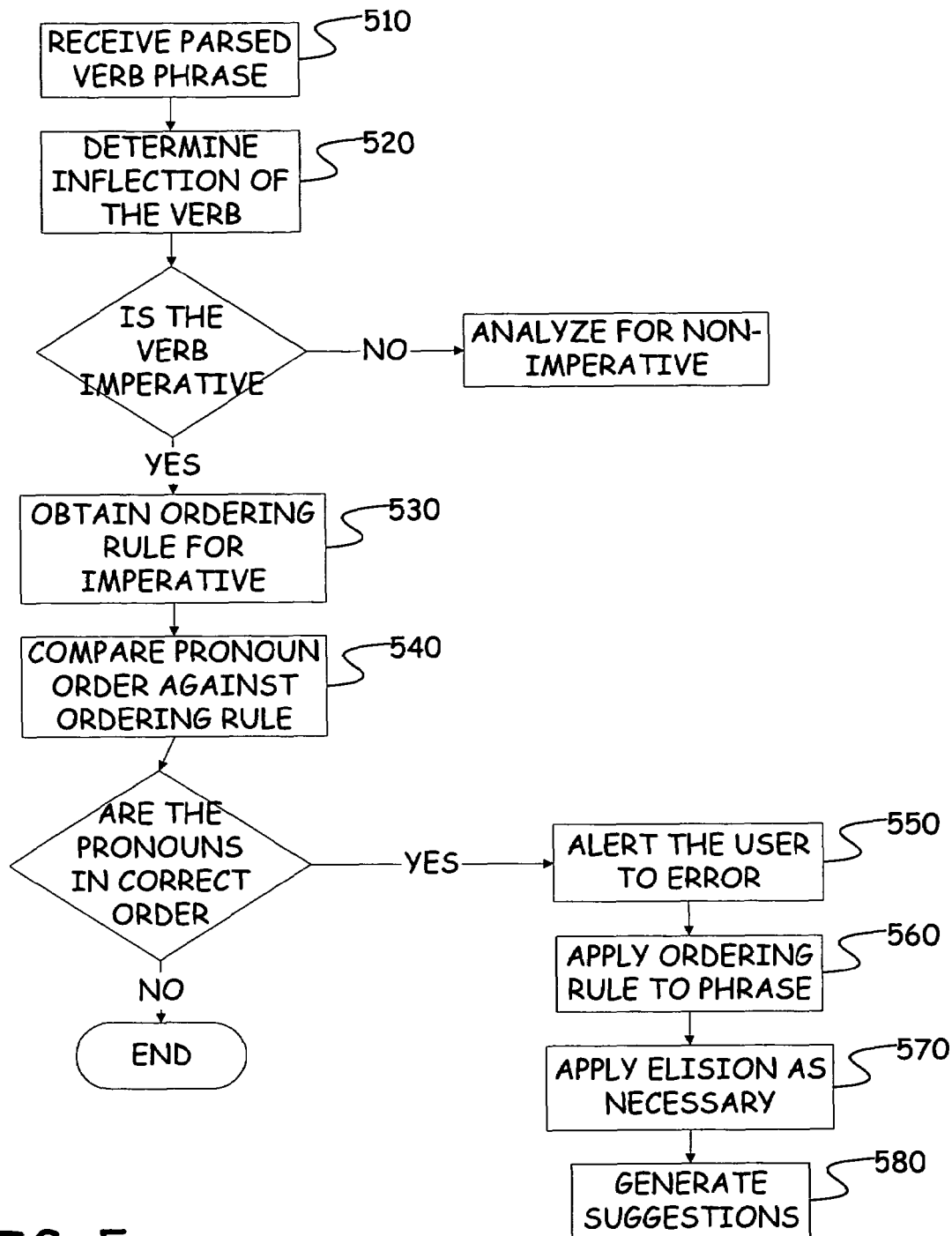
FIG. 5 is a flow diagram illustrating the steps that are executed by the grammar checker when the inflection of the verb is imperative.

If either of the above conditions is met, the system selects an ordering rule for the pronouns based on the inflection of the verb in the verb phrase and the character of the identified pronouns in the verb phrase. FIG. 5 illustrates the steps that are executed by the grammar checker when the inflection of the verb is imperative according to one embodiment of the present invention.

The identified verb phrase is received at the grammar checker following the parsing of the sentence by the parser. This is illustrated at step 510. The parsing of the textual input can be done according to the methods discussed above, or any other method that provides the grammar checker with information related to the inflection and case of the words of the textual input. As discussed above, the system will not activate unless the verb phrase contains a verb and at least two pronouns in the categories stated above (accusative and/or dative, and/or locative). However, in alternative embodiments, the check for multiple pronouns can occur at this point. For purposes of this discussion it will be assumed that the verb phrase that is received in the textual input is "donne moi le." (give me it). This phrase is grammatically incorrect because the pronouns are in the incorrect order for the imperative.

The grammar rule interpreter 260 then determines the inflection of the verb. This is illustrated at step 520. In the above example the grammar rule interpreter 260 is able to identify that the verb is imperative because the verb phrase lacks a subject. The lack of a subject is noted, because during the parsing and tokenization of the sentence the tokenizer 280 did not identify a subject in the sentence for the verb. In French there are very strict rules about the ordering of pronouns when the inflection of the verb is imperative. As discussed above, these rules are often ignored by a traditional grammar checker, because it is assumed that the author of the sentence will not make these mistakes.

Once the verb has been identified as imperative, the grammar rule interpreter 260 accesses the ordering rule component and obtains from a list of ordering rules in the ordering rule component 240 a pronoun ordering rule for imperatives. This is illustrated at step 530. This ordering rule for the imperative instructs the grammar rule interpreter 260 that pronouns are to come after the imperative verb, and that the pronouns are ordered in the following case order: Accusative then dative then locative.

Next, the grammar rule interpreter 260 compares the order of the pronouns against the order defined by the ordering rule. This is illustrated at step 540. This check can illustratively be performed in one of two ways. First the system simply compares the ordering rule order against the pronoun order of the words in the sentence. In this embodiment, if the words are out of grammatical order, the grammar checker can provide to the user an indication that the phrase is incorrect. This indication can be done through the use of a green squiggle, a highlighting of the phrase, italicizing the phrase or any other indication to the user that the typed phrase is incorrect. This indication to the user is illustrated at step 550. Alternatively, the grammar checker can initialize an ordering equation, and place the words of the phrase in the order defined by the ordering rule. Then the grammar checker can compare the generated word order with the original order using a string compare or other comparison method.

In any case, if the words were found to be out of order, the grammar rule interpreter 260 applies the ordering rule for the type of sentence. This is illustrated at step 560. In applying the ordering rule, the grammar rule interpreter 260 generates a list of the pronouns in the phrase and their proper position in the phrase. This list is illustrated in FIG. 6. As the present phrase includes an imperative verb the grammar rule interpreter 260 lists the pronouns so that 1) the accusative pronoun precedes the dative and/or the locative, and 2) the dative pronoun precedes the locative. So the general order is accusative first, dative second, and locative third, although one of these may be null. All words preceding the accusative pronoun in a sentence are grouped together, and ordered in the order which they appeared in the original phrase. However, other methods of grouping can be used when multiple pronouns or words of the same case are encountered.

Next the grammar rule interpreter 260 places the words from the list in the generated order to generate a corrected phrase. Then the corrected phrase is output to the user, as a suggestion. This is illustrated at step 580. During the generation of the suggested phrase the grammar checker performs any necessary elision on the pronouns. This is illustrated at step 570. Elision is necessitated when the first pronoun ends in a vowel, and the second pronoun begins with a vowel. If elision is necessary, the grammar checker combines the two pronouns into a single compound word by removing the vowel at the end of the first pronoun and replacing it with an apostrophe "'". For example, "me en" becomes "m'en" when elision is performed. If elision is required, the grammar rule interpreter 260 will provide as its suggestion the elided form of the phrase. Conversely, if elision is present and is no longer required by the new ordering, the grammar checker restores the non-elided form of the word. During the check for elision the grammar checker also checks to see if the imperative version of the verb is a member of a first group of verbs that ends in a vowel when inflected in the singular imperative. If the imperative version of the verb ends in a vowel and the pronoun begins with a vowel the system applies an "s" to the end of the verb to conform with the French grammar rules.

Also at this time, in the imperative case, hyphens may be added between the verb and the words of the pronoun phrase, and between the pronouns in that phrase. Thus the corrected form of the phrase "donne moi le" displayed to the user would be "Donne-le-moi".

Figure 7:
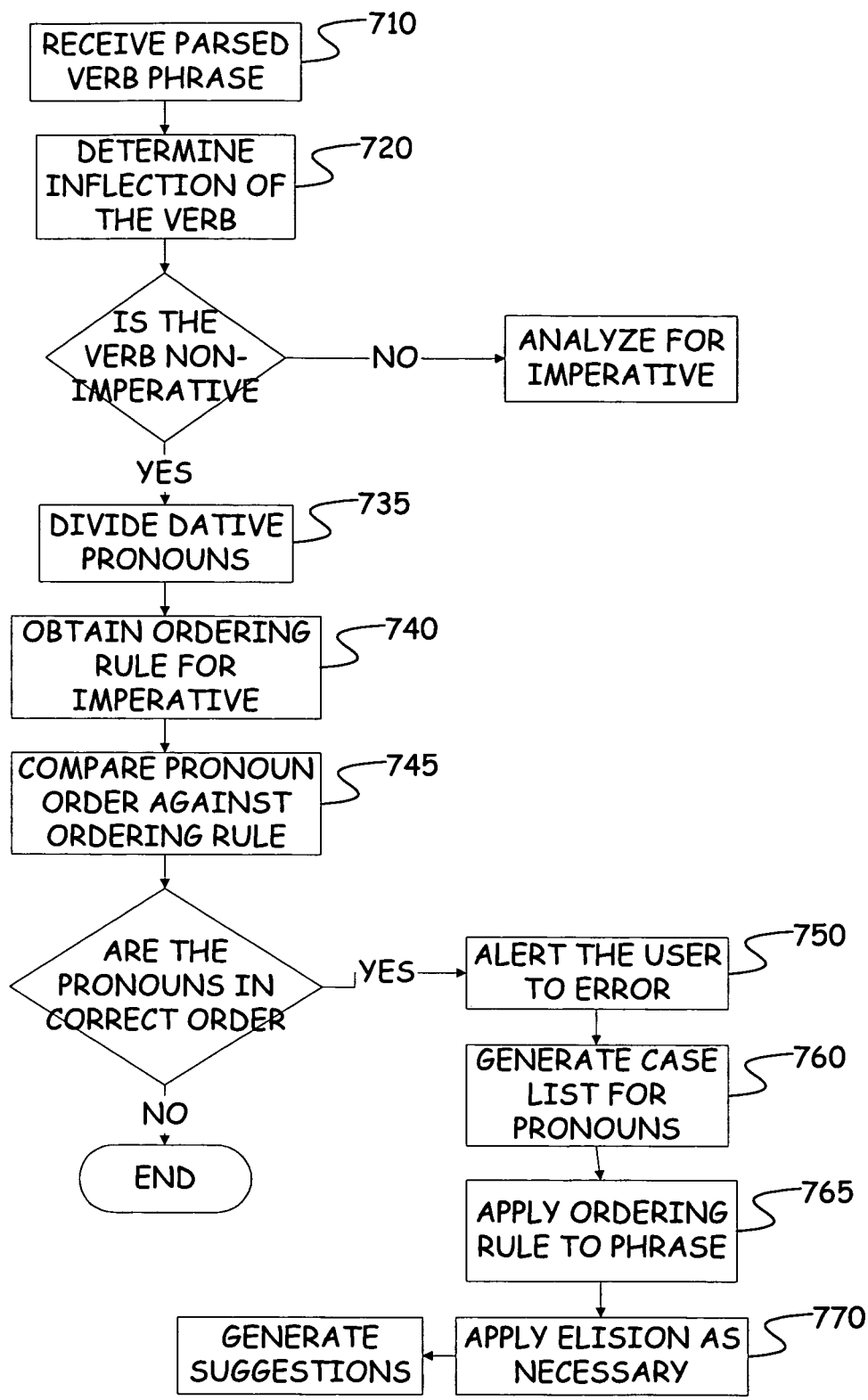
FIG. 7 is a flow diagram illustrating the steps that are executed by the grammar checker when a non-imperative French verb is detected.

FIG. 7 is a flow diagram illustrating the steps that are executed by the grammar checker 200 when a non-imperative French verb is encountered as the head word of a verb phrase according to one embodiment of the present invention. Non-imperative verbs are verbs that occur in a textual input as a normal, non-command type, sentence. For this example it will be assumed that the phrase entered is "Il en le ramène" (he brings him/it from there), which includes an incorrect ordering of the pronouns in the phrase.

The process executed by the grammar checker for a non-imperative verb phrase is similar to the process discussed above in FIG. 5, steps 510 through 520, and are illustrated as steps 710 through 720 respectively. However, because there are different ordering rules for pronouns when the verb is non-imperative, additional steps are executed by the grammar rule interpreter 260 when applying the ordering rules. Specifically, non-imperative verbs have dative pronouns that can occur prior to the accusative pronoun, and occur after the accusative pronoun. The pronouns in this group are divided into two groups and are referred to as pre-dative pronouns and post-dative pronouns. The nomenclature of pre and post is used to signify the placement of the dative pronoun relative to the accusative pronoun. The division of the dative pronouns into pronoun groups is illustrated at step 735.

The dative pronouns me, te, se, nous, and vous (me, you, (him, her, them), us, you) in French are the pre-dative pronouns, and precede the accusative in a grammatically correct sentence. The dative pronouns lui and leur in French are the post-dative pronouns, and should follow the accusative pronoun in a grammatically correct sentence.

Once the grammar checker has identified each of the pronouns in the sentence, and determined the inflection of the verb as non-imperative, the grammar rule interpreter 260 obtains the ordering rule from the ordering rule component. This is illustrated at step 740. This ordering rule includes the list of pronouns that are pre-dative, and a list of pronouns that are post-dative. Based on the ordering rule the grammar checker checks the original text, by matching the identified pronouns with their current location in the text against the correct location described by the rule. This is illustrated at step 745. If the words are in the correct order, in one embodiment the grammar rule interpreter 260 does nothing with the sentence. If the words are in the incorrect order the grammar rule interpreter 260 penalizes the phrase by highlighting or other indication to the user that the phase is incorrect. This is illustrated at step 750.

If the grammar rule interpreter 260 determined the pronouns were out of order in the phrase, it attempts to place the words in the correct order by using the obtained ordering rule. As the present sentence includes a non-imperative verb phrase, and the pronouns are out of correct order, the grammar rule interpreter 260 generates a list of each of the words in the phrase and their identified part of speech, including whether the pronoun is a pre-dative, post-dative, accusative, or locative. This is illustrated at step 760. Next the grammar checker places each word into correct order, using the ordering rule for non-imperative at step 765. Thus the incorrect sentence of "Il en le ramène" is corrected according to the following ordering: subject+pre-dative+accusative+post-dative+locative+verb. (Il le en ramène) . An example of the list and ordering is illustrated in FIG. 8. This sentence is presented to the user as a suggested correction to the original text. This suggestion to the user is illustrated at step 780. However, prior to presentation of the suggestion to the user, the grammar rule interpreter 260 will check to see if elision is necessary to any words in the suggested correction at step 770. If there is a need to elide words in the suggestion, they will be elided prior to presentation to the user. Thus, "Il l'en ramène" will be presented to the user as the suggested correction.

In an alternative embodiment, the grammar rule interpreter 260 applies the ordering rule to the words in the phrase, by initializing an ordering equation, and placing the word in the sentence in the order defined by the equation. Following the insertion of the words in the equation the grammar checker compares this version of the phrase with the original phrase. If there is no difference the phrase is ignored by the grammar checker. If there is a difference, the grammar checker highlights the incorrect phrase to the user, and the phrase generated by the grammar checker is presented to the user as a suggestion for correction.

Also at the time of presenting the corrected version of the sentence or phrase to the user, the grammar rule interpreter can generate additional alternatives for the incorrect phrase. This can occur, for example, when the pronouns are out of order for a complete phrase, but would be in correct order if the phrase was split by a comma. Thus, the sentence "Jean lui le donne." (John himself gives it) has two possible corrections: 1) Jean le lui donne. (having a pronoun ordering error) and 2) Jean, lui, le donne. where a comma between the pronouns generates a correct phrase. Both of these options would be presented to the user as suggestions.

Although the present invention has been described with reference to particular embodiments, workers skilled in the art will recognize that changes may be made in form and detail without departing from the spirit and scope of the invention.

What is claimed is:

1. A computer-implemented method of determining if a word in a textual input is positioned grammatically incorrectly in the textual input, the method comprising:
   identifying a verb phrase of a sentence in the textual input, using a processor of the computer;
   identifying a marker word in the verb phrase, the marker word being a verb in the verb phrase;
   identifying at least two pronouns associated with the verb phrase and determining a case of each of the at least two pronouns;
   determining an inflection of the marker word, wherein determining an inflection comprises determining whether the verb is imperative or non-imperative;
   selecting a pronoun ordering rule, using a processor of the computer, from a plurality of pronoun ordering rules based on the determined inflection of the marker word and the case of each of the at least two pronouns, wherein the pronoun ordering rule is selected independent of an order and part-of-speech of words in the sentence other than the words in the verb phrase and the at least two pronouns, and wherein selecting pronoun ordering rule comprises:
      if the inflection of the verb is imperative, selecting a first ordering rule from the plurality of ordering rules;
      if the inflection of the verb is non-imperative, selecting a second ordering rule from the plurality of ordering rules; and
      obtaining a pronoun case ordering rule from the selected ordering rule based on the case of each of the at least two pronouns;
   determining, using the processor of the computer, if the at least two pronouns are in a grammatically incorrect position in the sentence based on the selected pronoun ordering rule; and
   re-ordering, using the processor of the computer, any of the at least two pronouns that are in a grammatically incorrect position based on the pronoun case ordering rule, wherein re-ordering comprises re-ordering a first pronoun within the sentence such that the case of the first pronoun in the re-ordered sentence is substantially similar to the case of the first pronoun in the sentence in the textual input.

2. The method of claim 1 further comprising:
   following ordering, determining if a word prior to or following the first pronoun in the phase is subject to a combination rule;
   if the word is subject to the combination rule, combining the word with the first pronoun; and
   modifying the spelling of the combined word.

3. The method of claim 2 wherein modifying the spelling of the combined word comprises performing elision on the combined word.

4. The method of claim 1 and further comprising:
   following ordering, determining if the first pronoun in the phrase is in an elided form, determining if the first pronoun does not require elision, and, in response, restoring the first pronoun to a non-elided form.

5. The method of claim 1 wherein the first ordering rule comprises:
   identifying a pronoun having an accusative case;
   identifying a pronoun having a dative case; and
   ordering the pronoun having the accusative case first and the pronoun having the dative case second.

6. The method of claim 1 wherein applying the second ordering rule comprises:
   identifying a pronoun having an accusative case;
   identifying a pronoun having a dative case; and
   ordering the pronoun having the dative case first and the pronoun having the accusative case second.

7. The method of claim 6 wherein applying the second ordering rule further comprises:
   identifying a pronoun having a locative case; and
   ordering the locative pronoun after the accusative.

8. The method of claim 1, the method further comprising:
   applying a hyphen between the verb and the first pronoun.

9. The method of claim 8 wherein if the verb ends in a vowel and the first pronoun begins with a vowel or a semi vowel, adding an additional character to the verb.

10. The method of claim 1, wherein determining if the at least two pronouns in the textual input are in a grammatically incorrect position in the sentence comprises:
    providing an indication to a user that the words in the textual input are in a grammatically incorrect word order; and
    providing to the user at least one correction for the grammatically incorrect word order.

11. The method of claim 1 wherein applying the second ordering rule comprises:
    identifying a pronoun having an accusative case;
    identifying a pronoun having a pre-dative case indication;
    identifying a pronoun having a post-dative case indication; and
    ordering the pronouns pre-dative, accusative, and post-dative.

12. The method of claim 1, wherein re-ordering the first pronoun within the sentence comprises generating a reordered sentence based on the phrase in the textual input, the reordered phase containing the first pronoun determined to be in a grammatically incorrect position in the sentence.

13. The method of claim 12, wherein the sentence in the textual input comprises a plurality of words in a first order, and wherein the reordered sentence contains the plurality of words in a second order.

14. The method of claim 1, wherein reordering comprises reordering a second pronoun in the sentence to create a corrected sentence, wherein the first and second pronouns in the corrected sentence have the same case as the first and second pronoun in the sentence in the textual input.

15. A grammar checker configured to correct incorrect placement of words in a textual input, the grammar checker comprising:
    a processor;
    a parsing component receiving a textual input including a plurality of words in a first order, identifying a part-of-speech associated with each of the plurality of words in the textual input, and identifying a marker word in a verb phrase in the textual input, and identifying at least two pronouns associated with the verb phrase, wherein the identified marker word is a verb in the verb phrase;
    an ordering rule component containing a plurality of ordering rules;
    a grammar rule interpreter determining if the plurality of words in the textual input are in a correct grammatical order, by determining an inflection of the verb and a case of each of the at least two pronouns associated with the verb phrase, and requesting an ordering rule from the ordering rule component based on the identified marker word in the textual input and the at least two pronouns associated with the verb phrase, wherein the ordering rule is obtained from the ordering rule component based the determined inflection of the verb and the case of each of the at least two pronouns, independent of the parts-of-speech associated with words in the textual input other than the verb phrase; and an alternative generator implemented on the processor and applying the ordering rule to the textual input to re-order at least one pronoun in the textual input to obtain a re-ordered phrase, wherein the re-ordered phrase includes the at least one pronoun having a substantially similar case as the at least one pronoun in the textual input.

16. The grammar checker of claim 15 wherein if the inflection of the verb is imperative, the grammar rule interpreter is configured to request a first ordering rule from the ordering rule component.

17. The grammar checker of claim 16 wherein the first ordering rule instructs the grammar rule interpreter to order pronouns in the textual input accusative case first, dative case second and locative case third.

18. The grammar checker of claim 16 wherein if the inflection of the verb is non-imperative the grammar rule interpreter is configured to request a second ordering rule from the ordering rule component.

19. The grammar checker of claim 18 wherein the grammar rule interpreter is configured to identify pronouns in the textual input as pre-dative, post-dative, accusative, and locative cases.

20. The grammar checker of claim 19 wherein the second ordering rule instructs the grammar rule interpreter to order pronouns in the textual input pre-dative case first, accusative case second, post-dative case third, and locative case fourth.

* * * * *